United States Patent
Sivadasan

(10) Patent No.: US 11,249,751 B2
(45) Date of Patent: Feb. 15, 2022

(54) METHODS AND SYSTEMS FOR AUTOMATICALLY UPDATING SOFTWARE FUNCTIONALITY BASED ON NATURAL LANGUAGE INPUT

(71) Applicant: Babu Vinod Sivadasan, Fremont, CA (US)

(72) Inventor: Babu Vinod Sivadasan, Fremont, CA (US)

(*) Notice: Subject to any disclaimer, the term of this patent is extended or adjusted under 35 U.S.C. 154(b) by 0 days.

(21) Appl. No.: 16/429,055

(22) Filed: Jun. 2, 2019

(65) Prior Publication Data
US 2020/0159526 A1 May 21, 2020

Related U.S. Application Data

(60) Provisional application No. 62/679,199, filed on Jun. 1, 2018.

(51) Int. Cl.
*G06F 8/73* (2018.01)
*G06F 40/58* (2020.01)
*G06F 8/34* (2018.01)

(52) U.S. Cl.
CPC .............. *G06F 8/73* (2013.01); *G06F 8/34* (2013.01); *G06F 40/58* (2020.01)

(58) Field of Classification Search
CPC .... G06F 11/3684; G06F 8/77; G06F 11/3692; G06F 8/73; G06F 40/58; G06F 8/34
USPC ........................................................ 717/101
See application file for complete search history.

(56) References Cited

U.S. PATENT DOCUMENTS

| 7,840,936 | B2 * | 11/2010 | Seeger ...................... G06F 8/34 717/104 |
| 8,516,509 | B2 * | 8/2013 | Nethercutt .......... G06F 11/3495 711/163 |
| 8,639,638 | B2 * | 1/2014 | Shae ...................... G06F 16/332 706/11 |
| 8,898,627 | B2 * | 11/2014 | Gass ........................ G06F 8/65 717/106 |

(Continued)

OTHER PUBLICATIONS

Campagna et al., "Almond: The Architecture of an Open, Crowdsourced, Privacy-Preserving, Programmable Virtual Assistant", [online], 2017, pp. 341-350, [Retrieved from internet on Oct. 5, 2021], <https://dl.acm.org/doi/pdf/10.1145/3038912.3052562> (Year: 2017).*

*Primary Examiner* — S. Sough
*Assistant Examiner* — Zengpu Wei

(57) ABSTRACT

In one aspect, a method for automatically updating software functionality based on natural language input includes the step of providing a visual programming application; based on either a conversational specification input from the user or based on a fully functional specification document detailing the functional requirements, uploaded as input. The user conversation input comprises a natural language input, whereas the functional specification document is written in natural language detailing the scope and goal of the requirement The method includes the step of interpreting the user specification input to determine an associated functionality goal. The method includes the step of generating a functionality associated with the functionality goal. The method includes the step of integrating the functionality into an application development process.

4 Claims, 7 Drawing Sheets

(56) References Cited

U.S. PATENT DOCUMENTS

| | | | |
|---|---|---|---|
| 9,304,744 B2 * | 4/2016 | Repenning | G06F 11/3664 |
| 10,191,721 B1 * | 1/2019 | Kostello | G06F 11/3664 |
| 2006/0212848 A1 * | 9/2006 | Kasubuchi | G06F 8/70 |
| | | | 717/121 |
| 2007/0168932 A1 * | 7/2007 | Seeger | G06F 8/10 |
| | | | 717/105 |
| 2007/0281772 A1 * | 12/2007 | Gwaltney | A63F 13/12 |
| | | | 463/9 |
| 2011/0283269 A1 * | 11/2011 | Gass | G06F 8/65 |
| | | | 717/168 |
| 2012/0191629 A1 * | 7/2012 | Shae | G06F 16/332 |
| | | | 706/11 |
| 2012/0204193 A1 * | 8/2012 | Nethercutt | G06F 11/3495 |
| | | | 719/330 |
| 2018/0129648 A1 * | 5/2018 | Chakravarthy | G06F 40/205 |
| 2018/0314689 A1 * | 11/2018 | Wang | G10L 15/07 |
| 2019/0034172 A1 * | 1/2019 | Kostello | G06F 8/30 |

* cited by examiner

METHODS AND SYSTEMS FOR AUTOMATICALLY UPDATING SOFTWARE FUNCTIONALITY BASED ON NATURAL LANGUAGE INPUT

CROSS-REFERENCE TO RELATED APPLICATIONS

This application claims priority to U.S. provisional patent application No. 62/679,199, titled METHODS AND SYSTEMS FOR AUTOMATICALLY UPDATING SOFTWARE FUNCTIONALITY BASED ON NATURAL LANGUAGE INPUT and filed on 1 Jun. 2018. This application is hereby incorporated by reference in its entirety.

BACKGROUND

1. Field

This application relates generally to automated natural language processing for creating and deploying software, and more particularly to a system, method and article of automatic manufacture of software functionality based on natural language input whether it is the creation of new software of modifying a software system that is live and running.

2. Related Art

Software development in general is very inefficient with multiple people playing specialized roles (e.g. business analyst, systems analyst, architect, software engineer, QA engineer, dev ops engineer, and project manager, etc.), working together to develop and deliver software for large systems. However, gaps in communication between the roles can lead to inferior delivery of the software. Each role communicates with the next role through a series of artifacts like business requirement documents, test cases, architecture diagrams, etc. With the current state of the technology, it should be possible to eliminate inefficiencies in this process by having machines play a number of these roles and let the humans play the role of specification/requirement creators thereby making the process extremely efficient. Accordingly, there is a need to improve software development and maintenance to be more efficient.

SUMMARY OF THE INVENTION

In one aspect, a method for automatically updating software functionality based on natural language input includes the step of providing a visual programming application; based on either a conversational specification input from the user or based on a fully functional specification document detailing, the functional requirements, uploaded as input. The user conversation input comprises a natural language input, whereas the functional specification document is written in natural language detailing the scope and goal of the requirement The method includes the step of interpreting the user specification input to determine an associated functionality goal. The method includes the step of generating a functionality associated with the functionality goal. The method includes the step of integrating the functionality into an application development process.

In another aspect, a computerized method for updating a software module's functionality with a set of temporary hooks includes the step of receiving a user's natural language processing (NLP) instructions to update a computer application's functionality; automatically interpreting a user's intent. The method includes the step of identifying the computer application's functionality based on the automatic interpretation of the user's intent. The method includes the step of, based on the computer application's functionality, identifying a software module that controls the computer application's functionality. The method includes the step of identifying and providing a set of hooks that update the computer application's functionality in the software module. The method includes the step of integrating the set of hooks into the software module. The method includes the step of with the set of hooks, updating the software module.

Figure 1:
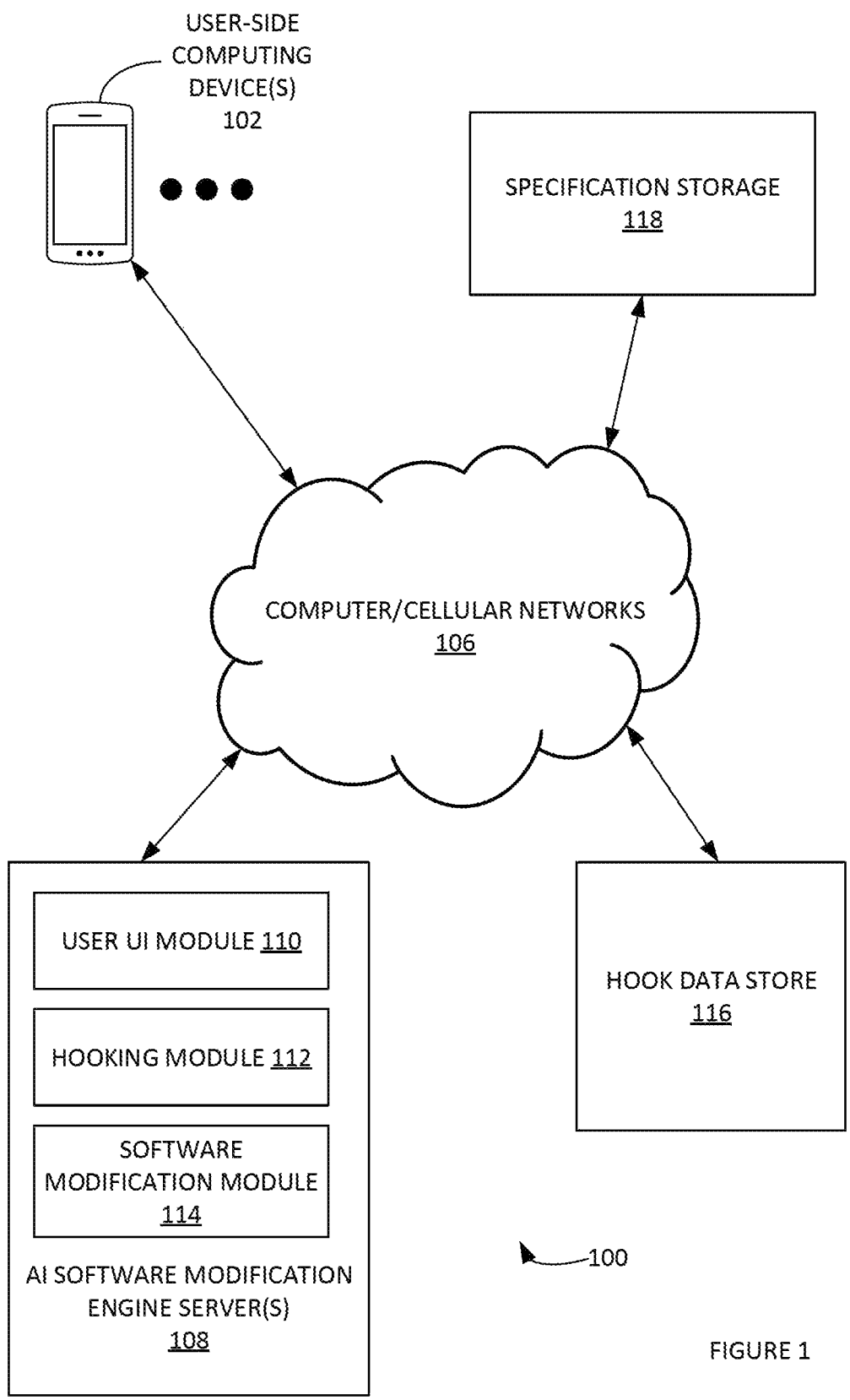
FIG. 1 illustrates an example system for automatically updating software functionality based on natural language input, according to some embodiments.

The Figures described above are a representative set, and are not an exhaustive with respect to embodying the invention.

DESCRIPTION

Disclosed are a system, method, and article of automatically updating software functionality based on natural language input. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Cloud computing can involve deploying groups of remote servers and/or software networks that allow centralized data storage and online access to computer services or resources. These groups of remote serves and/or software networks can be a collection of remote computing services.

Hooking can be a technique used to alter or augment the behavior of an operating system, applications, or of other software components by intercepting function calls or messages or events passed between software components. Code that handles such intercepted function calls, events or messages is called a hook.

Exemplary Systems

FIG. 1 illustrates an example system 100 for automatically updating software functionality based on natural language input, according to some embodiments.

The user-side computing device(s) 102 can include/access an AI software modification application. AI software modification application can be accessed via an application (e.g. via a widget, web page, mobile-application page, etc.). AI software modification application can be used to implement modifications to software module functionalities via natural language input. Accordingly, AI software modification application can provide functionalities for a user to input voice, text, graphical inputs, etc. Said inputs indicate user preferences for updates to specified functionalities. As noted, AI software modification engine server(s) 106 can then automatically determine specific updates to software modules that will implement the user inputs. For example, AI software modification engine server(s) 106 can select one hook to integrate into specified hook anchors in the code of the software modules. AI software modification engine server(s) 106 can integrate the hooks into the software modules via the hook anchors. AI software modification engine server(s) 106 can manage the modifications to the code of the software modules using the hooks. AI software modification engine server(s) 106 can then de-integrate the hook(s) from the software module. AI software modification engine server(s) 106 can present a test version of the updated software functions to the user for testing and/or review purposes.

Computer/Cellular networks 106 can include the Internet, text messaging networks (e.g. short messaging service (SMS) networks, multimedia messaging service (MMS) networks, proprietary messaging networks, instant messaging service networks, email systems, etc. Computer/Cellular networks 106 can include cellular networks, satellite networks, etc. Computer/Cellular networks 106 can be used to communicate messages and/or other information (e.g. videos, tests, articles, digital images, videos, other educational materials, etc.) from the various entities of system 100.

As noted supra, AI software modification engine server(s) 106 can include modules for updating software code based on natural language input from a user. Example users an include non-software programmers in an enterprise such as, inter alia: business analysts, corporate officers, project managers, end users etc.

AI software modification engine server(s) 108 can include hooking module 112. Hooking module 112 can attach hooks prior to the application being started and/or while inserted while software is already running.

Hooks can be attached to software modules at specified hook anchor based on a preset identifier provided in the software module and/or hook anchor. A hook, can intercept function calls to either monitor or replace them entirely. For example, by using a disassembler, the entry point of a function within a module can be found. It can then be altered to instead dynamically load some other library module and then have it execute desired methods within that loaded library. If applicable, another related approach by which hooking can be achieved is by altering the import table of an executable. This table can be modified to load, any additional library modules as well as changing what external code is invoked when a function is called by the application.

A hook anchor can be a prespecified location in a software module for integrating a hook. Hook anchors can have preset identifiers. These identifiers can identify the software module, the functionalities of the software module, the types of hooks accepted by the hook anchor, permissions for the types of users that can make updates to the software module, time parameter restrictions, etc.

In some examples, an administrator entity can manually assist in identifying hooks and/or software updates. The administrator can also select specific hooks and/or generate new hooks based on the user request. For example, if a hook related to a user request does not exist, the administrator can generate the hook and identify a software module for the hook. The administrator can place a hook anchor in the software module as well. In other examples, the hooking module 112 can automatically perform these tasks in an algorithmic manner based on, inter alia, on: the content of the user request, user permissions, software module content, and the like.

An alternative method for achieving function hooking is by intercepting function calls through a wrapper library. When creating a wrapper, you make your own version of a library that an application loads, with all the same functionality of the original library that it will replace. That is, all the functions that are accessible are essentially the same between the original and the replacement. This wrapper library can be designed to call any of the functionality from the original library, or replace it with an entirely new set of logic.

Operating systems and software may provide the means to easily insert event hooks at runtime. It is available provided that the process inserting the hook is granted enough permission to do so. Idea of an admin that can manually assist user.

AI software modification engine server(s) 108 can include various other functionalities such as, inter alia: web servers, SMS servers, IM servers, chat bots, database system managers, e-commerce engines, etc. AI software modification engine server(s) 106 can include manage a mobile-device application in both user-side computing device(s) 102.

AI software modification engine server(s) 108 can manage a chat-bot service. Chat-bot service can provide various interactive services via specified instant messaging platforms. The chat-bot can include a virtual programming assistant for a user. AI software modification engine server(s) 108 can utilize chatbots to interact with user to, inter alia: answer basic questions about software module functionality preferences; schedule software module upgrades; implement software module modifications; etc. It is noted that modules 110-114 can query the user via a chat bot. In this way, the user can update preferences, review test models, etc. via a chat bot/personal programming assistant interface.

AI software modification engine server(s) 108 can include a user interface 110 module. User interface 110 module can interpret user inputs regarding updates to software code system. User interface 110 module can provide a user interface for a user to input commands in the user-side computing device 102. User interface 110 module can include speech to text engine. Speech to text engine can recognize and translate the spoken language of user into computer-readable text. Speech to text engine can use various automatic speech recognition (ASR) algorithms. User interface 110 module can manage permissions for users (e.g. passwords, etc.). In one example, User interface 110 module can recognize the voices of users and use the voice recognition to determine which software modules the user has permission to modify with which preferences.

Speech to text engine can listen to conversations between a plurality of users. Speech to text engine can translate the conversation to a machine-readable format. AI software modification engine server(s) 106 can then translate the user conversation into a set of user intentions to automatically updating software functionality based on natural language input as provided herein. AI software modification engine server(s) 106 can use machine-learning techniques to train itself to improve natural language programming techniques. For example, AI software modification engine server(s) 106 can study and construct of algorithms that can learn from and make predictions on data. AI software modification engine server(s) 106 can provide a prediction model that initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). The training dataset often consist of pairs of an input vector (e.g. user natural language programming input) and the corresponding answer vector or scalar (e.g. a corresponding programming action) as a target. The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit, on the training dataset while tuning the model's hyperparameters. Users involved in the conversation can be queried for verifications and their responses can be used to improve the machine learning process as well.

AI software modification engine server(s) 106 can enable collaborative natural-language programming sessions that involve a plurality of users. Based on a pre-defined user-hierarchy (e.g. enterprise job title, etc.), AI software modification engine server(s) 106 can prioritize user inputs and make corresponding software updates. AI software modification engine server(s) 106 can query users and/or otherwise inform users that a conflict of input has been detected in the conversation. Users can then clarify an input to prioritize.

AI software modification engine server(s) 106 can provide live sand-box version of the software application/functionality being modified. In this way, a user can test a current version of a software functionality/application being modified before committing it. A user can determine the impact of change on mode of operation. AI software modification engine server(s) 106 can provide a list of possible impacts (e.g. can run simulations, perform automated impact analysis, etc.). AI software modification engine server(s) 106 can implement changes to a specified set of versions of the software application/functionality being modified. For example, AI software modification engine server(s) 106 can update/generate a Web-based version, an Android® application version, an Apple iPhone® version, etc. based on user selections. AI software modification engine server(s) 106 can build a self-documenting module that provide natural-language documentation. This can be used for training materials. The documentation can be included/located in the same areas as the binary codes as user-readable natural-language comments. This can be used to explain parts of code and translate metadata back to human-readable documentation.

AI software modification engine server(s) 106 can include a text-to-speech functionality. This can enable the AI software modification engine server(s) 106 to communicate with users in a relevant natural-language in a spoken form (and/or text forms via a user interface, text messages, emails, etc.). This functionality can be leveraged to provide natural-language descriptions of all or portions of the software functionality/application being examined/modified/created. Users can designate a user programming expertise level and the AI software modification engine server(s) 106 can set a level of jargon, detail and technical expertise to provide information to the user at.

In this way, AI software modification engine server(s) 106 can implement software programming through conversations and generic programming statements (e.g. 'iterate until a specified condition'; 'repeat a hundred times'; 'for every employee, generate a questionnaire about their satisfactions with these ten questions'; etc.). The AI software modification engine server(s) 106 can query back with text to voice that generates human understandable follow up questions. AI software modification engine server(s) 106 can direct a conversation with the user that drills down into an industry topic to obtain relevance. For example, AI software modification engine server(s) 106 can verify the domain-specific definition of a term/key word (e.g. group in a health plan, group in an educational domain, etc.) In this way, the AI software modification engine server(s) 106 can be adapted to multiple verticals (e.g. health care, education, insurance, banking, etc.). For example, AI software modification engine server(s) 106 can determine if the key word 'plan' is a retirement plan, an insurance plan, a healthcare plan, etc. AI software modification engine server(s) 106 can perform term recognition based on the known current domain. AI software modification engine server(s) 106 can use a taxonomy of key words for each domain and determine the current domain and then the appropriate key word and its definition.

User interface 110 module can use machine learning algorithms, ranking engines, search engines and the like to determine a user's intent. User interface 110 module can present the interpreted intent to the user for verification. User intent or query intent is the identification and categorization of what a user online intended or wanted when they typed their search terms into an online web search engine for the purpose of search engine optimization or conversion rate optimization. User interface 110 module can use various ways of classifying or naming the categories of the different types of user intent. These can include clustering algorithms and the like (e.g. informational, transactional, and navigational methods).

AI software modification engine server(s) 106 can include one or more ranking and sorting functionalities AI software modification engine server(s) 106 can rank hook and/or software module query results. For example, given a query for a hook and/or software module, AI software modification engine server(s) 106 can determine and a collection of hooks and/or software modules that match the query, AI software modification engine server(s) 106 can rank/sort the documents according to a set of specified criteria so that the best results appear early in the result list displayed to the user. Ranking can be reduced to the computation of numeric scores on query/document pairs; a baseline score function for this purpose is the cosine similarity between tf-idf vectors representing the query and the document in a vector space model, BM25 scores, or probabilities in a probabilistic IR model. AI software modification engine server(s) 106 can implement a sorting algorithm on hook and/or software module results based on which ones best match the user's programming intention. AI software modification engine server(s) 106 can maintain an indexing system. The indexing system can include user uploaded tags, annotations, metadata, etc. associated with hooks and/or software modules to be searched.

Software modification module 114 can use hooks inserted into a software module to update the code of said software module. In this way, software modification module 114 can modify the functionality of the software module. For example, the software module cart be the hypertext markup language of a webpage. Software modification module 114 can use a hook inserted into the webpage document to update the portion of the hypertext markup language of a webpage can controls the background color of the webpage.

AI software modification engine server(s) 106 can utilize machine learning techniques (e.g. artificial neural networks, etc.). Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter cilia: decision tree learning, association rule learning, artificial neural networks, inductive logic programming, support vector machines, clustering, Bayesian networks, reinforcement learning, representation learning, similarity and metric learning, and/or sparse dictionary learning.

AI software modification engine server(s) 108 can obtain one or more conversations between a group of users. AI software modification engine server(s) 108 determine the subject matter of the conversation.

Figure 2:
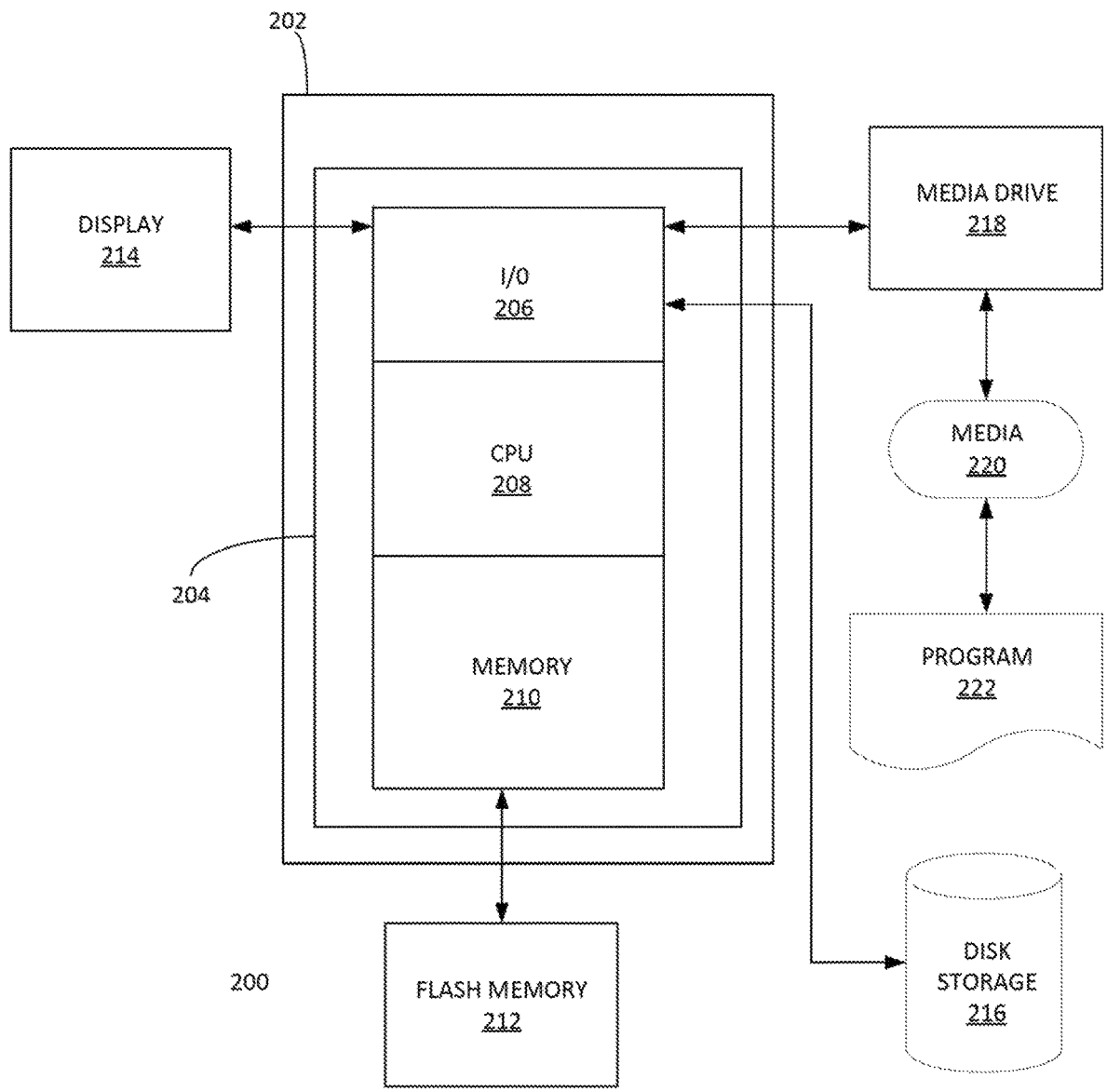
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing, system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
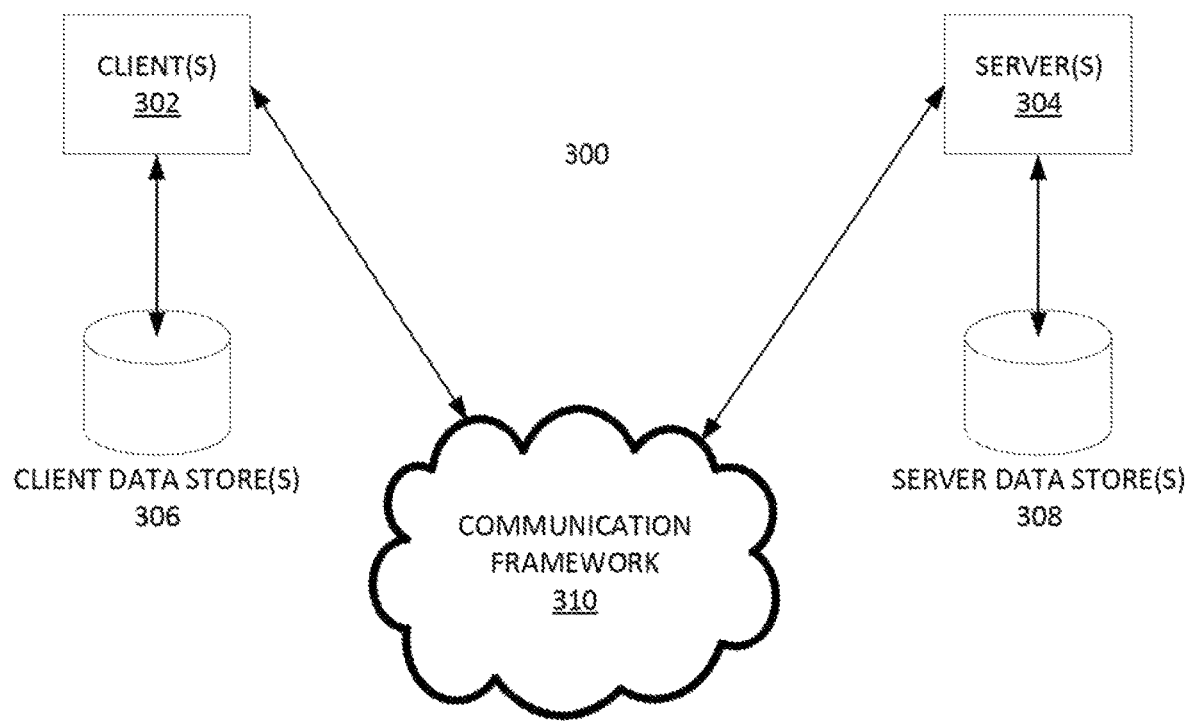
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Exemplary Methods

The following methods/processes can be implemented by systems 100-300.

Figure 4A:
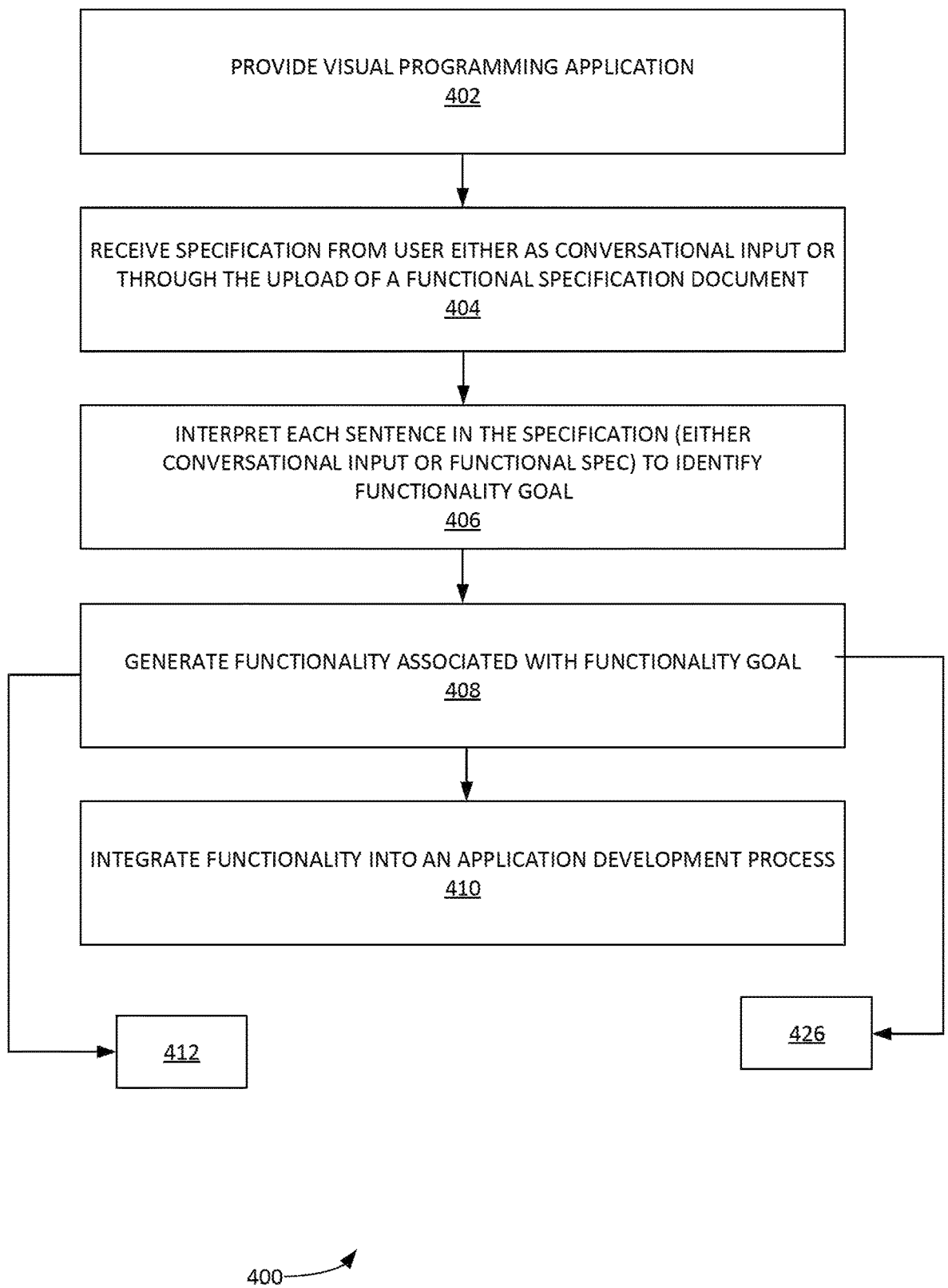
FIGS. 4 A-B illustrate an example process for implementing automatically updating software functionality with NLP input from a user, according to some embodiments.
Figure 4B:
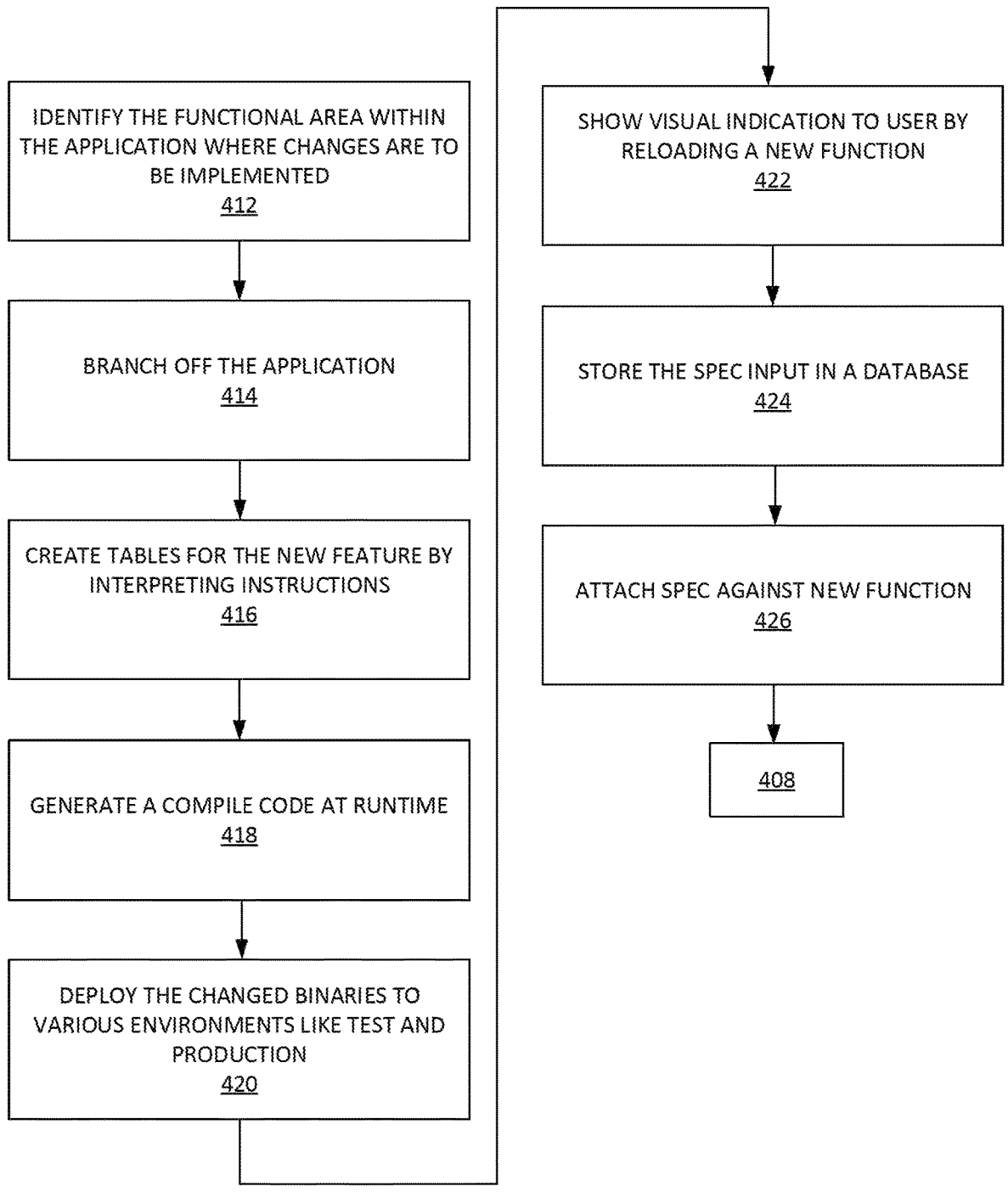

FIGS. 4 A-B illustrate an example process 400 for implementing automatically updating software functionality with NLP input from a user, according to some embodiments. In step 402, process 400 can provide visual programming application. In step 404, process 400 can receive a functional specification as input. The functional specification can be user conversational input, a specification document(s), etc. In one example, the process 400 can receive a specification from user either as conversational input and/or through the upload of a functional specification document. In step 406, process 400 can interpret user conversation input to determine an associated functionality goal. Process 400 can interpret each sentence in the specification (either conversational input or functional spec) to identify functionality goal. In step 408, process 400 can generate functionality associated with functionality goal. In step 410, process 400 can integrate functionality into an application development process.

In step 412, process 400 can identify the functional area within the application where changes are to be implemented. In step 414, process 400 can branch off the application. For example, a version of the application can be placed in a sandbox for modification, analysis and testing. In step 416, process 400 can create tables and/or classes and/or programs for the new feature by interpreting instructions. In one example, in step 416, process 400 can create data tables, classes and any middleware business objects and functions needed for the new feature.

In step 418, process 400 can generate a compile code at runtime. In one example, process 400 can modify the database schema if necessary. Process 400 can compile the dynamically created code. In step 420, process 400 can deploy code to a production level. For example, process 400 can deploy code to a test and/or production environment(s). Process 400 can deploy the changed binaries to various environments like test and production.

In step 422, process 400 can show visual indication to the user by reloading a new function. For example, process 400 can selectively reload the changes/modifications. In step 424, process 400 can store the specification input in a database. In step 426, process 400 can attach specification against new function. For example, process 400 can connect the code that was created to implement the function in the code itself such that there is complete traceability.

It is noted that process 400 can maintains the functional specification tied to the application in production, allowing the software to always be synchronized with any applicable documentation. Process 400 can provide the ability to generate functional specifications back from the update code.

Figure 5:
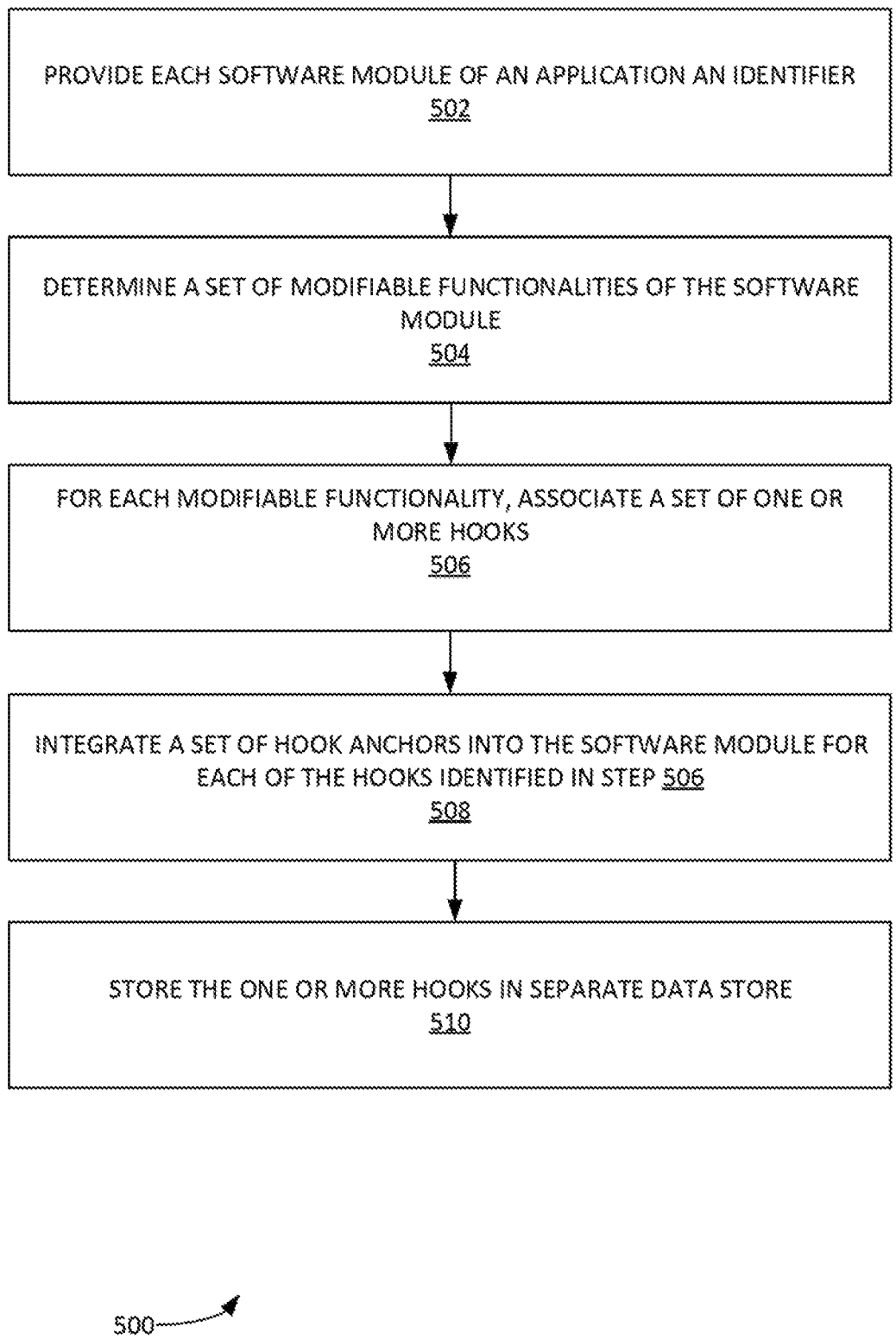
FIG. 5 illustrates an example process of identifying and integrating hook anchors into a software module, according to some embodiments.

FIG. 5 illustrates an example process of identifying and integrating hook anchors into a software module, according to some embodiments. In step 502, process 500 can provide each software module of an application an identifier. In step 504, process 500 can determine a set of modifiable functionalities of the software module. In step 506, process 500 can, for each modifiable functionality, associate a set of one or more hooks. In step 508, process 500 can integrate a set of hook anchors into the software module for each of the hooks identified in step 506. In step 510, process 500 can store the one or more hooks in separate data store.

Figure 6:
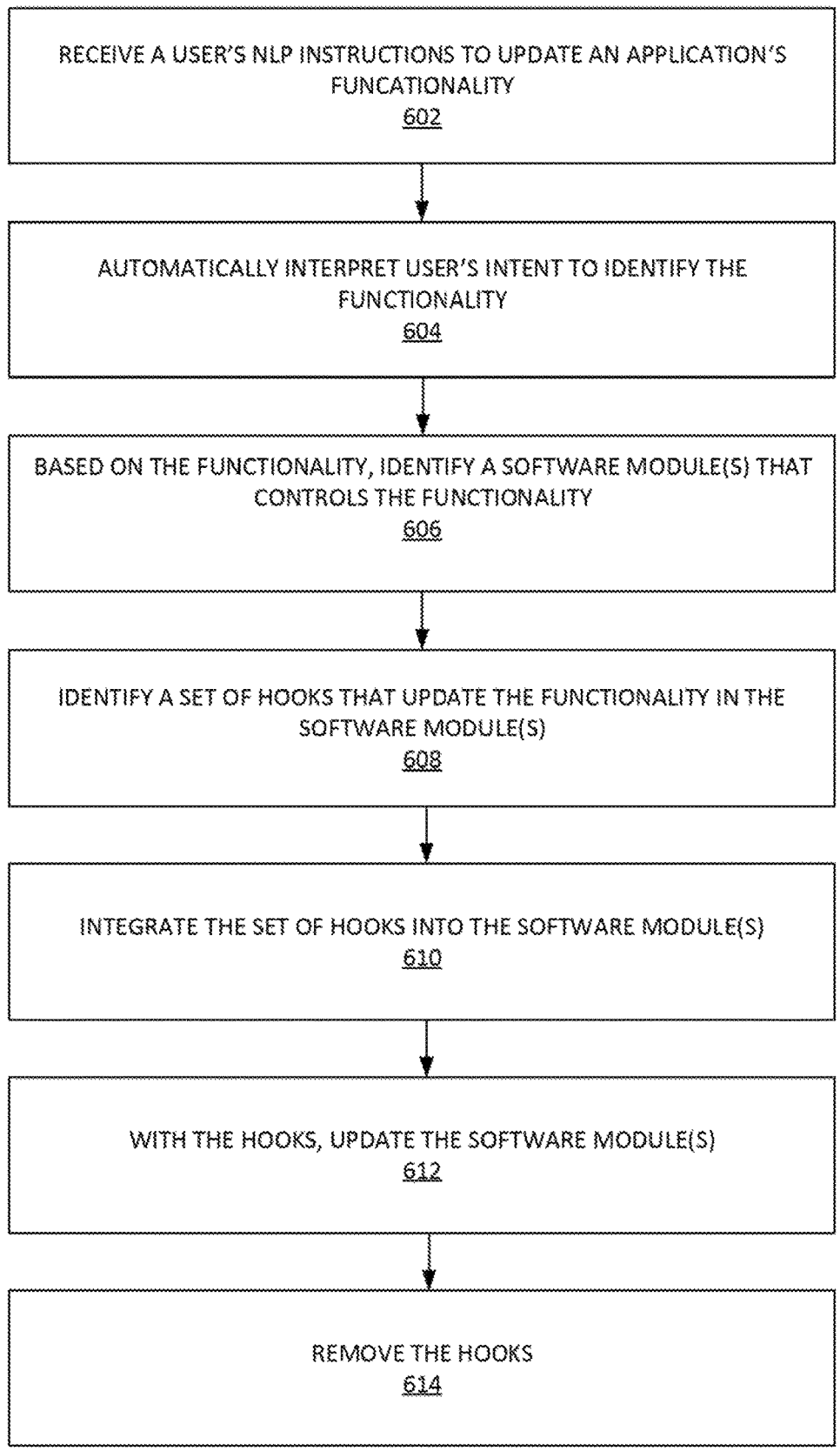
FIG. 6 illustrates an example process of updating a software module's functionality with temporary hooks, according to some embodiments.

FIG. 6 illustrates an example process of updating a software module's functionality with temporary hooks, according to some embodiments. In step 602, process 600 can receive a user's NLP instructions to update an application's functionality. In step 604, process 600 can automatically interpret user's intent to identify the functionality. In step 606, process 600 can based on the functionality, identify a software module(s) that controls the functionality. In step 608, process 600 can identify a set of hooks that update the functionality in the software module(s). In step 610, process 600 can integrate the set of hooks into the software module (s). with the hooks, update the software module(s). In step 612, process 600 can remove the hooks.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method for automatically updating software functionality based on natural language input comprising:
    providing a visual programming application;
    receiving a functional specification as input, wherein the functional specification comprises a user conversation input;
    interpreting the user conversation input to determine an associated functionality goal;
    providing a virtual programming assistant, wherein the virtual programming assistant utilizes a chatbot functionality to interact with the user to:
        implement the associated functionality goal,
        answer questions about software module functionality preferences, and
        schedule a software module upgrade;
    generating a functionality associated with the functionality goal;
    integrating the functionality into an application development process;
    identifying and integrating a set of hook anchors into a software module that implements the functionality, and wherein the step of identifying and integrating a set of hook anchors into a software module that implements the functionality further comprises;
        providing each software module of the application being developed an identifier,
        determining a set of modifiable functionalities of the software module,
        for each modifiable functionality, associating a set of one or more hooks,
        integrating the set of hook anchors into the software module, for each of the set of one or more hooks, and
        storing the one or more hooks in separate data store, and
    wherein
        the user conversation input comprises a natural language input, wherein the functional specification further comprises a digital text version of a software specification.

2. The method of claim 1, further comprising:
creating a more accurate software documentation or functional specification from analysis of a live application using a metadata stored in a system.

3. A computer system automatically updating software functionality based on natural language input comprising:
a processor;
a memory containing instructions when executed on the processor, causes the processor to perform operations that:
provide a visual programming application;
receive a user conversation input, wherein the user conversation input comprises a natural language input;
interpret the user conversation input to determine an associated functionality goal;
provide a virtual programming assistant, wherein the virtual programming assistant utilizes a chatbot functionality to interact with the user to:
implement an associated functionality goal,
answer questions about software module functionality preferences, and
schedule a software module upgrade;
generate a functionality associated with the functionality goal;
identify and integrate a set of hook anchors into a software module that implements the functionality; and
integrate the functionality into an application development process,
wherein a user conversation input comprises a natural language input,
wherein a functional specification further comprises a digital text version of a software specification.

4. A computerized method for updating a software module's functionality with a set of temporary hooks comprising:
receiving a user's natural language processing (NLP) instructions to update a computer application's functionality;
automatically interpreting a user's intent;
providing a virtual programming assistant, wherein the virtual programming assistant utilizes a chatbot functionality to interact with the user to:
implement an associated functionality goal,
answer questions about software module functionality preferences, and
schedule a software module upgrade;
identifying the computer application's functionality based on the automatic interpretation of the user's intent;
based on the computer application's functionality, identifying a software module that controls the computer application's functionality;
identifying and providing a set of hooks that update the computer application's functionality in the software module;
integrating the set of hooks into the software module;
removing the set of hooks from the software module; and
with the set of hooks, updating the software module,
wherein a user conversation input comprises a natural language input, wherein a functional specification further comprises a digital text version of a software specification.

* * * * *